US012681851B2

(12) United States Patent
Kim et al.

(10) Patent No.: US 12,681,851 B2
(45) Date of Patent: Jul. 14, 2026

(54) STORAGE DEVICE AND METHOD OF MANAGING WRITE OPERATIONS

(71) Applicant: Samsung Electronics Co., Ltd., Suwon-si (KR)

(72) Inventors: Jeuk Kim, Suwon-si (KR); Seokhwan Kim, Suwon-si (KR); Daejun Park, Suwon-si (KR); Jaeyoon Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/761,749

(22) Filed: Jul. 2, 2024

(65) Prior Publication Data
US 2025/0190340 A1 Jun. 12, 2025

(30) Foreign Application Priority Data
Dec. 12, 2023 (KR) ........................ 10-2023-0179741

(51) Int. Cl.
*G06F 12/02* (2006.01)
*G06F 11/07* (2006.01)

(52) U.S. Cl.
CPC ...... *G06F 12/0246* (2013.01); *G06F 11/0751* (2013.01)

(58) Field of Classification Search
CPC ............. G06F 12/0246; G06F 11/0751; G06F 2212/7202; G06F 3/0659; G06F 3/0604; G06F 3/0608; G06F 3/064; G06F 3/0658; G06F 12/0646; G06F 2212/1016; G06F 2212/1044
See application file for complete search history.

(56) References Cited

U.S. PATENT DOCUMENTS

| | | | |
|---|---|---|---|
| 10,599,339 B2 | 3/2020 | Jiang et al. | |
| 10,996,894 B2 | 5/2021 | Guo et al. | |
| 11,372,543 B2 | 6/2022 | Benisty et al. | |
| 11,513,726 B2 | 11/2022 | Jang | |
| 2018/0113629 A1 | 4/2018 | Kim et al. | |
| 2020/0034039 A1 | 1/2020 | Jiang et al. | |
| 2020/0409601 A1 | 12/2020 | Helmick et al. | |
| 2021/0019083 A1 | 1/2021 | Guo et al. | |
| 2021/0318801 A1 | 10/2021 | Benisty et al. | |
| 2021/0373809 A1 | 12/2021 | Benisty | |
| 2022/0100419 A1 | 3/2022 | Jang | |
| 2023/0229358 A1 | 7/2023 | Xu et al. | |
| 2024/0143509 A1* | 5/2024 | Sela ...................... | G06F 3/0644 |
| 2025/0053338 A1* | 2/2025 | Jadon ...................... | G06F 12/10 |

* cited by examiner

*Primary Examiner* — Kevin Verbrugge
(74) *Attorney, Agent, or Firm* — Fish & Richardson P.C.

(57) ABSTRACT
An example embodiment provides a storage device including: a non-volatile memory including a plurality of zones configured to sequentially store data using a write pointer indicating a position to write data; and a storage controller configured to receive a plurality of task requests respectively including a logical block address and a write command, and perform a write operation corresponding to the write command of a first task request among the plurality of task requests to the non-volatile memory in response to a position of the write pointer matching a first logical block address corresponding to the first task request.

11 Claims, 12 Drawing Sheets

STORAGE DEVICE AND METHOD OF MANAGING WRITE OPERATIONS

CROSS-REFERENCE TO RELATED APPLICATION

This application claims priority to and the benefit, under 35 U.S.C. § 119, of Korean Patent Application No. 10-2023-0179741 filed in the Korean Intellectual Property Office on Dec. 12, 2023, the entire contents of which are incorporated herein by reference.

BACKGROUND

The present disclosure relates to storage devices and operating methods thereof.

As a nonvolatile memory, the flash memory may maintain stored data even when power is turned off. Recently, storage devices including flash memories such as solid state drives (SSD) and memory cards have been widely used.

Generally, a non-volatile memory may store data subject to random access. Meanwhile, as garbage collection (GC) is frequently performed on the entire area due to random access, the lifespan of the storage device may be reduced. As a large over provisioning (OP) area is allocated for frequent garbage collection, wear leveling, bad block management, and the like, the available storage capacity of the storage device may be reduced. To prevent or reduce this in likelihood, recently, a technique may be used to distinguish memory blocks of a non-volatile memory device into zones and sequentially store related data within the zones.

SUMMARY

The present disclosure attempts to provide a storage device that may write data successively to a non-volatile memory.

An example embodiment provides a storage device including: a non-volatile memory including a plurality of zones configured to sequentially store data using a write pointer indicating a position to write data; and a storage controller configured to receive a plurality of task requests respectively including a logical block address and a write command, and perform, a write operation corresponding to the write command of a first task request among the plurality of task requests to the non-volatile memory in response to a position of the write pointer matching a first logical block address corresponding to the first task request.

Another example embodiment provides an operating method of a storage device, including: receiving a plurality of task requests, each task request respectively including a logical block address and a write command in a non-volatile memory, the non-volatile memory including a plurality of zones including a plurality of blocks whose addresses are adjacent to each other; comparing a first logical block address corresponding to a first task request among the plurality of task requests and a position of a write pointer indicating a position to write data to the non-volatile memory; and performing a write operation corresponding to a write command of the first task request on an address corresponding to the first logical block address corresponding to the first task request of the non-volatile memory in response to the first logical block address and the position of the write pointer matching.

Another example embodiment provides a storage system including: comparing the updated position of the first write pointer with the second logical block address corresponding to the second task request in the waiting list, transmitting a data request signal corresponding to the second task request in response to the first write pointer and the second logical block address matching, and receiving second data corresponding to the second task request in response to the data request signal, and performing a write operation corresponding to a write command of the second task request to the non-volatile memory.

BRIEF DESCRIPTION OF THE DRAWINGS

FIG. 2 illustrates a storage controller according to some example embodiments.

DETAILED DESCRIPTION

Figure 1:
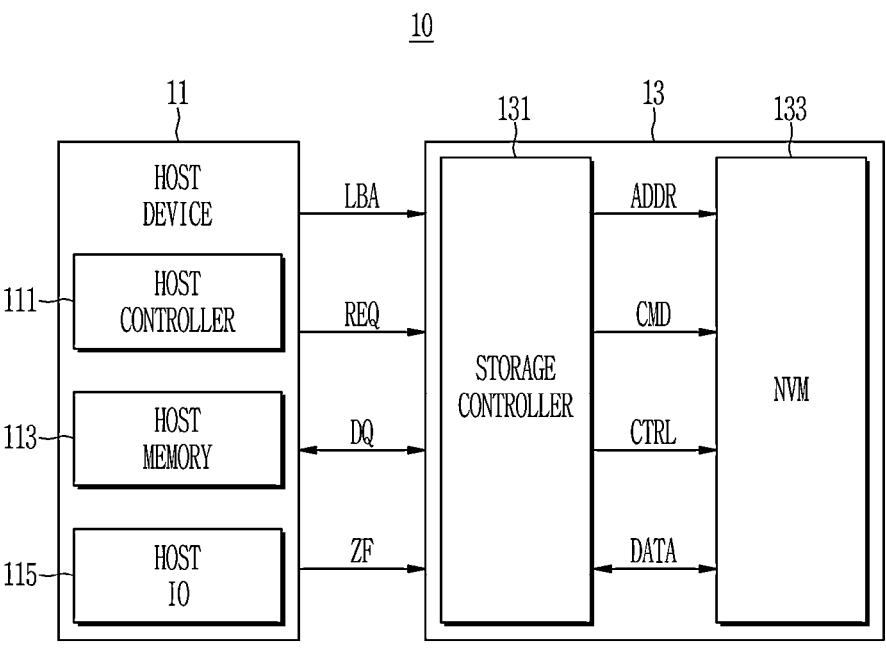
FIG. 1 illustrates a storage system according to some example embodiments.

The present disclosure will be described more fully hereinafter with reference to the accompanying drawings, in which example embodiments of the disclosure are shown. As those skilled in the art would realize, the described example embodiments may be modified in various different ways, all without departing from the spirit or scope of the present disclosure.

Accordingly, the drawings and description are to be regarded as illustrative in nature and not restrictive. Like reference numerals designate like elements throughout the specification. In the flowcharts described with reference to the drawings in this specification, the operation order may be changed, various operations may be merged, certain operations may be divided, and certain operations may not be performed.

In addition, a singular form may be intended to include a plural form as well, unless an explicit expression such as "one" or "single" is used. Terms including ordinal numbers such as first, second, and the like will be used only to describe various constituent elements, and are not to be interpreted as limiting these constituent elements. These terms may be used for a purpose of distinguishing one constituent element from other constituent elements.

Figure 2:
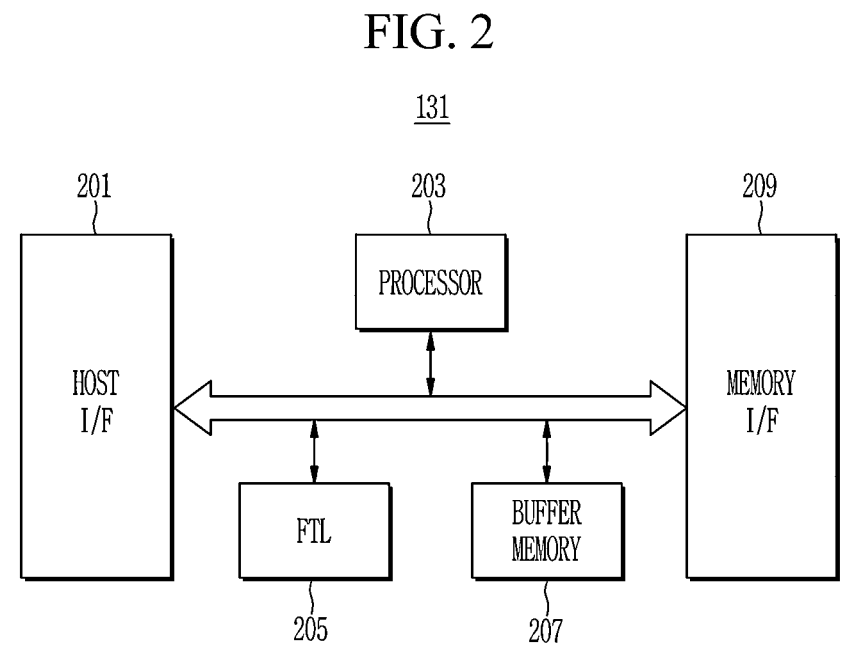

FIG. 1 illustrates a storage system according to an example embodiment. FIG. 2 illustrates a storage controller according to an example embodiment.

In the example embodiments, a storage system 10 may be included in user devices such as a personal computer, a laptop computer, a server, a media player, and a digital camera, or in automotive devices such as a navigation device, a black box device, and a vehicle electric device. Alternatively, the storage system 10 may be included in a mobile system such as a mobile phone, a smart phone, a tablet personal computer, a wearable device, a healthcare device, or an Internet of things (IoT) device.

As shown in FIG. 1, the storage system 10 includes a host device 11 and a storage device 13.

The host device 11 controls an overall operation of the storage system 10.

The host device 11 may communicate with the storage device 13 through various interfaces. For example, the host device 11 may communicate with the storage device 13 through various interfaces such as a universal serial bus (USB), a multimediacard (MMC), a PCIExpress (PCI-E), an AT Attachment (ATA), a serial AT Attachment (SATA), a parallel AT Attachment (PATA), a small computer system interface (SCSI), a serial attached SCSI (SAS), an enhanced small disk interface (ESDI), an integrated drive electronics (IDE), and/or a non-volatile memory express (NVMe).

The host device 11 may provide a logical block address LBA indicating a logical address and a request signal (REQ) to the storage device 13. In addition, the host device 11 may exchange data DQ with the storage device 13.

Specifically, the host device 11 may include a host controller 111, a host memory 113, and a host IO 115.

The host controller 111 may control an operation (for example, calculation, logic, control, input/output, or the like) of the host device 11. Specifically, the host controller 111 may transmit the request signal (REQ) to each storage device 13 through the host IO 115.

For example, the request signal (REQ) may include a write command. In some example embodiments, the host controller 111 may transmit the request signal (REQ) including the write command, the logical block address LBA at which the data DQ is to be written, and the data DQ to the storage device 13. The storage device 13 may write the data DQ to a block corresponding to the logical block address LBA in response to the request signal (REQ).

In some example embodiments, the host controller 111 may transmit a plurality of task requests to the storage device 13. For example, the task request may include the request signal (REQ) including the write command and the logical block address LBA.

In some example embodiments, the host controller 111 may transmit a zone flag (ZF) indicating that the storage device 13 is a zoned device. In some example embodiments, the host controller 111 may transmit the zone flag (ZF) together with the request signal (REQ). As will be described later, when the storage device 13 is a partitioned device, sequential writing may be forced. The host controller 111 may transmit an enable level zone flag (ZF) to the storage device 13 to force sequential writing to the storage device 13. The zone flag (ZF) may be transmitted through a separate interface between the host device 11 and the storage device 13, but the present disclosure is not limited thereto, and the zone flag (ZF) may be transmitted together with the logical block address LBA through an interface through which the logical block address LBA is transmitted.

The host controller 111 may be, for example, a central processing unit (CPU), a graphics processing unit (GPU), a microprocessor, or an application processor (AP).

The host memory 113 may store instructions and data that are executed and processed by the host controller 111. For example, the operating system running by the host controller 111 may include a file system for file management, and a device driver for controlling peripheral devices including the storage device 13 at an operating system level. In some example embodiments, the host memory 113 may function as a buffer memory for temporarily storing the data DQ to be transmitted to the storage device 13 or data transmitted from the storage device 13.

For example, a file system may receive various requests from applications running on the host controller 111. In some example embodiments, the file system may transmit the request signal (REQ) to the storage device 13 in order for the host controller 111 to perform various tasks, including specific tasks for the storage device 13.

The host IO 115 may communicate with the storage device 13. Specifically, the host IO 115 may receive internal state information of each storage device 13 from the storage device 13. In addition, the host IO 115 may receive the target internal state information generated by the host controller 111 to transmit it to each storage device 13.

The storage device 13 may be accessed by the host device 11. For example, the storage device 13 may be implemented as a solid state drive (SSD), a smart SSD, an embedded multimedia card (eMMC), an embedded universal flash storage (UFS) memory device, a UFS memory card, a compact flash (CF), an secure digital (SD), a micro secure digital (Micro-SD), a mini secure digital (Mini-SD), an extreme Digital (xD), a memory stick, or a similar form.

In some example embodiments, the storage device 13 may be connected to the host device 11 through a block accessible interface including a serial advanced technology attachment (SATA) bus, a small computer small interface (SCSI) bus, a non-volatile memory express (NVMe) bus, a serial attached SCSI (SAS) bus, a UFS, an eMMC, and the like.

In some example embodiments, the storage device 13 may be a partitioned device. A storage space of storage device 13 may be divided into a plurality of zones. The storage device 13 may support only sequential writing in each of the plurality of zones, and random writing may be prohibited in each of the plurality of zones. For example, the storage device 13 may be implemented based on various standards such as Zoned NameSpace (ZNS) and Zoned Block Device (ZBD).

The storage device 13 may include a storage controller 131 and a non-volatile memory 133. The storage device 13 may store or process data DATA in response to the request signal (REQ) from the host device 11.

Specifically, the storage controller 131 may control the operation of the storage device 13 (see FIG. 1).

Referring to FIG. 2 together, the storage controller 131 may provide an address ADDR, a command CMD, a control signal (CTRL), and the like to the non-volatile memory 133 in response to the logical block address LBA and the request signal (REQ) received from the host device 11. That is, the storage controller 131 may provide signals to the non-volatile memory 133 to write data to the non-volatile memory 133 or read data from the non-volatile memory 133. In addition, the storage controller 131 and the non-volatile memory 133 may exchange the data DATA.

Specifically, the storage controller 131 may include a host interface 201, a processor 203, a flash translation layer (FTL) 205, a buffer memory 207, a memory interface 209, and the like.

The host interface 201 may transmit and receive a packet with the host device 11 (see FIG. 1). The packet transmitted from the host device 11 to the host interface 201 may include a command or data to be written to the non-volatile memory (133 in FIG. 1). The packet transmitted from the host interface 201 to the host device 11 may include a response to a command or data read from the non-volatile memory 133.

The processor 203 may control overall operations of the storage controller 131. The processor 203 may control the storage controller 131 by driving the firmware loaded in the FTL 205. In some example embodiments, the processor 203 may include a central processing unit (CPU), a controller, or an application specific integrated circuit (ASIC).

The processor 203 may drive various firmware or software driven by the storage controller 131. The processor 203 may use the buffer memory 207 as an operation memory of the processor 203. In addition, the processor 203 may use the non-volatile memory 133 or the host memory 113 as an operation memory of the processor 203.

For example, the processor 203 may control a data read operation from the non-volatile memory 133 and a data write operation to the non-volatile memory 133 by executing firmware.

The FTL 205 may include firmware or software that manages data writing, data reading, and sub-blocking, and/or block erasing operations of the non-volatile memory 133. The firmware of the FTL 205 may be executed by the processor 203. In some example embodiments, the FTL 205 may be implemented through various hardware automation circuits configured to perform the various maintenance operations described above. That is, the FTL 205 may be implemented as hardware, and various maintenance operations described above may be performed through hardware.

The FTL 205 may perform various maintenance operations to efficiently use the non-volatile memory 133. Specifically, the FTL 205 may perform various functions such as address mapping, wear-leveling, and garbage collection.

The address mapping operation may be an operation of changing a logical block address received from the host device 11 into a physical address used to actually store data in the non-volatile memory 133. Specifically, the FTL 205 may map the logical block address from the host device 11 and the physical address of the non-volatile memory 133 using an address mapping table.

The address mapping operation may be an operation of converting or mapping between a logical block address managed by the host device 11 and a physical address of the non-volatile memory 133. In some example embodiments, the FTL 205 may receive the zone flag (ZF) from the host device 11 through the host IO 115 (e.g. host interface). In some example embodiments, the FTL 205 may receive the request signal (REQ) from host device 11. When receiving the zone flag (ZF) together with the request signal (REQ), the FTL 205 may determine whether to perform an address mapping operation for the corresponding request signal (REQ) based on the logical block address LBA corresponding to the request signal (REQ).

Meanwhile, the FTL 205 may generate a waiting list. The waiting list may include information on a request signal (that is, an unprocessed request signal) in which an address mapping operation has not been performed among the received request signals (REQ). For example, the FTL 205 may not process the request signal (REQ) when positions of the logical block address LBA corresponding to the request signal (REQ) and a write pointer in the storage device 13 are different. The write pointer may include information on the position at which data will be written within the storage device 13. The FTL 205 may generate a waiting list including information on the unprocessed request signal (REQ). An operation of determining whether the FTL 205 performs an address mapping operation on the request signal (REQ) will be described later with reference to FIG. 5.

The wear leveling may be an operation of preventing or reducing excessive deterioration of a specific block by equalizing the frequency or number of uses of a plurality of memory blocks included in the non-volatile memory 133. For example, the wear leveling operation may be implemented through firmware or hardware that balances erase counts of physical blocks.

The garbage collection may be an operation of copying valid data of a block of the nonvolatile memory 133 to a new block and erasing the existing block so that the existing block may be reused in order to secure usable capacity in the non-volatile memory 133.

In some example embodiments, the FTL 205 may store data necessary to perform the operation of the FTL 205. For example, FTL 205 may store block information of the non-volatile memory 133; a garbage collection level for performing the garbage collection on the non-volatile memory 133; an address mapping table used to convert the logical address of the host device 11 to the physical address of the non-volatile memory 133; and an address mapping table managed by the waiting list, garbage collection, or wear leveling operation. Meanwhile, the present disclosure is not limited thereto, and data for performing the operation of the FTL 205 may be stored in the buffer memory 207 or the non-volatile memory 133.

The buffer memory 207 may store instructions and data that are executed and processed by the storage controller 131. The buffer memory 207 may temporarily store data stored or to be stored in the non-volatile memory 133.

The buffer memory 207 may be implemented as a volatile memory such as a dynamic random access memory (DRAM) and/or a static RAM (SRAM). However, it is not limited thereto, and the buffer memory 207 may be implemented as a resistive non-volatile memory, such as a magnetic RAM (MRAM), a phase change RAM (PRAM), or a resistive RAM (ReRAM), or various types of non-volatile memories, such as a flash memory, a nano floating gate memory (NFGM), a polymer random access memory (PoRAM), or a ferroelectric random access memory (FRAM).

In some example embodiments, the buffer memory 207 may store code data required for initial booting of the storage device 13. The buffer memory 207 may buffer the logical block addresses LBA, the request signal (REQ), the data DATA, the command, and the like received from the host 100. The signals buffered in the buffer memory 207 may be transmitted to and used in the non-volatile memory 133 through the memory interface 209. For example, the data DATA buffered in the buffer memory 207 may be written to the non-volatile memory 133.

In some example embodiments, the buffer memory 207 may store the waiting list generated by the FTL 205.

The buffer memory 207 is shown as being provided inside the storage controller 131, but the present disclosure is not limited thereto, and the buffer memory 207 may be provided outside the storage controller 131.

The memory interface 209 may provide signal transmission and reception with the non-volatile memory 133. The memory interface 209 may transmit commands and control signals along with data to be written to the non-volatile memory 133 to the non-volatile memory 133, or may receive data read from the non-volatile memory 133. This memory interface 209 may be implemented to comply with standard protocols such as Toggle or ONFI.

Referring back to FIG. 1, the non-volatile memory 133 may include a plurality of dies or chips including a memory cell array. For example, the non-volatile memory 133 may include a plurality of chips, and each of the plurality of chips may include a plurality of dies. In some example embodiments, the non-volatile memory 133 may also include a plurality of channels, each of which includes a plurality of chips.

The non-volatile memory 133 may include a NAND flash memory. In another example embodiment, the non-volatile memory 133 may include an electrically erasable programmable read-only memory (EEPROM), a phase change random access memory (PRAM), a resistive RAM (ReRAM), a resistance random access memory (RRAM), a nano floating gate memory (NFGM), a polymer random access memory (PoRAM), a magnetic random access memory (MRAM), a ferroelectric random access memory (FRAM), or a similar memory. Hereinafter, in the present disclosure, the non-volatile memory 133 will be described assuming that it is a NAND flash memory device.

Meanwhile, FIG. 1 illustrates that one storage device 13 includes one non-volatile memory 133, but the present disclosure is not limited thereto, and the storage device 13 may include a plurality of non-volatile memories.

Figure 3:
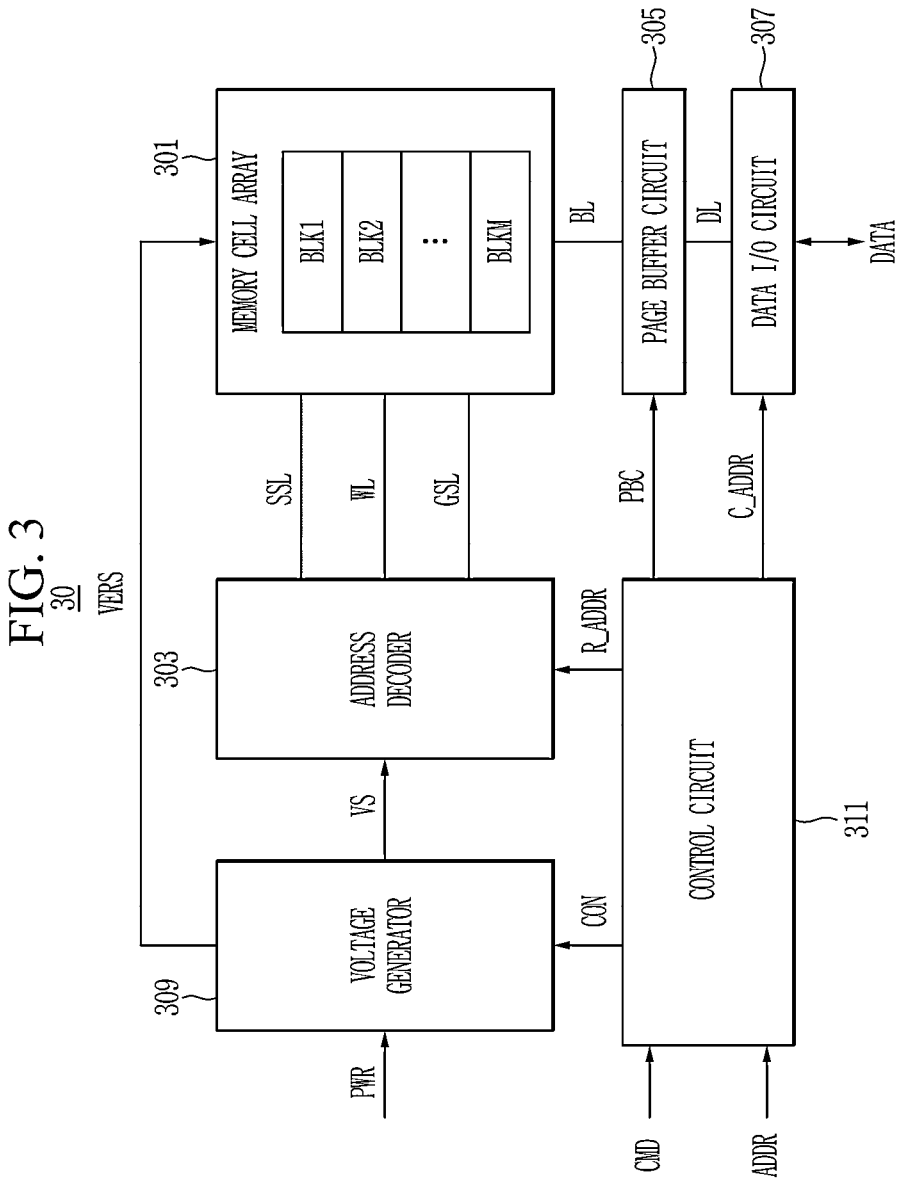
FIG. 3 illustrates a block diagram of an example of a non-volatile memory according to some example embodiments.
Figure 4:
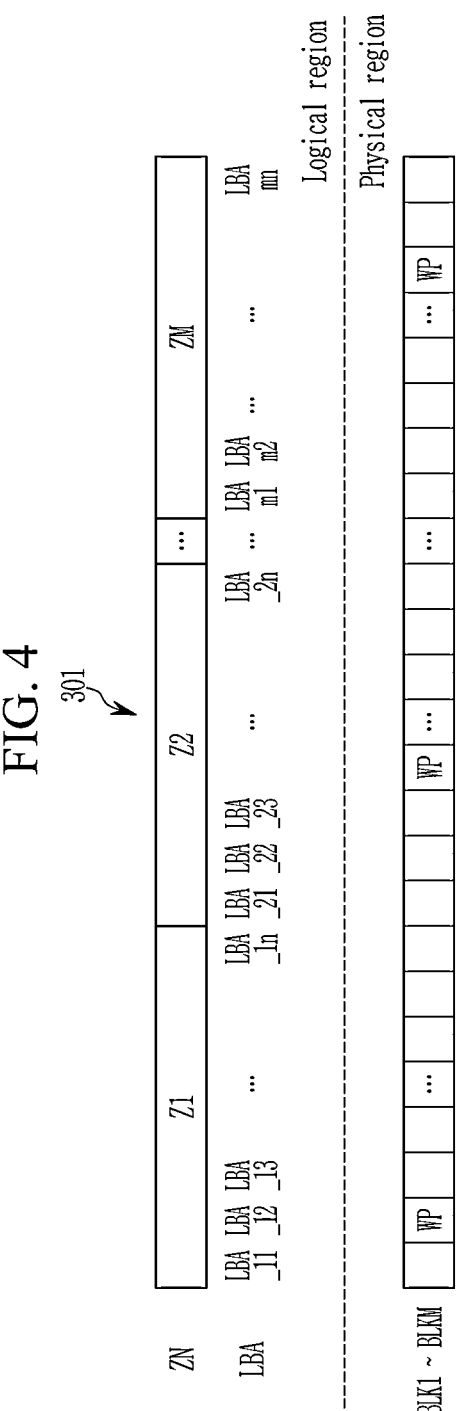
FIG. 4 illustrates a memory cell array according to some example embodiments.

FIG. 3 illustrates a block diagram of an example of a non-volatile memory according to an example embodiment. FIG. 4 illustrates a memory cell array according to an example embodiment.

Referring to FIG. 3, a non-volatile memory 30 includes a memory cell array 301, an address decoder 303, a page buffer circuit 305, a data input/output circuit 307, a voltage generator 309, and a control circuit 311.

The memory cell array 301 is connected to the address decoder 303 through a plurality of string selection lines SSL, a plurality of word lines WL, and a plurality of ground selection lines GSL. In addition, the memory cell array 301 is connected to the page buffer circuit 305 through a plurality of bit lines BL. The memory cell array 301 may include a plurality of memory cells connected to the plurality of word lines WL and the plurality of bit lines BL.

In some example embodiments, the memory cell array 301 may be formed to have a two-dimensional array structure or a three-dimensional vertical array structure.

It will be described with reference to FIG. 4 together. In FIG. 4, logical and physical areas of first to m-th zones Z1 to ZM are shown together. M may be any natural number. The logical area may include an address identifiable by the host device 11. For example, the logical area may include a logical block address LBA. The physical area may include positions or addresses of a memory block in the non-volatile memory 133. The logical area and the physical area may have a mapping relationship with each other.

Specifically, the memory cell array 301 may be logically or virtually divided into a plurality of memory blocks (BLK1, BLK2, . . . , BLKM). Each of the plurality of memory blocks may include a plurality of memory cells. Each of the plurality of blocks BLK may correspond to one logical block address LBA. A plurality of blocks of which addresses (ADDR) are adjacent to each other may be included in one zone (ZN). The first to m-th zones Z1 to ZM may be independent of each other.

Referring to the logical area, a storage space of the first zone Z1 may correspond to a first logical block in the first zone Z1 (e.g. eleventh) logical block address LBA_11 to (1n)-th logical block addresses LBA_1n. A storage space of the second zone Z2 may correspond to a first logical block in the second zone Z2 (e.g. 21ˢᵗ) logical block address LBA_21 to (2n)-th logical block addresses LBA_2n. A storage space of the m-th zone Zm may correspond to (m1)-th to (mn)-th logical block addresses LBA_m1 to LBA_mn.

Referring to the physical area, the memory cell array 301 may include a plurality of blocks BLK. Each of the plurality of blocks BLK may be classified into one of the plurality of zones Z1 to ZM. The plurality of blocks BLK in the first zone Z1 may be physically sequential blocks.

Each of the blocks included in the first zone Z1 may correspond to each of the first to the first to (1n)-th logical block addresses (LBA_11 to LBA1n) of the first zone Z1. The storage controller 131 may manage data corresponding to the write request received from the host device 11 to be logically and physically sequentially stored in the non-volatile memory 133. That is, the storage controller 131 may support sequential writing.

The storage controller 131 may sequentially store data in the non-volatile memory 133 using a write pointer. The write pointer may include information on the position at which data will be written within the storage device 13.

FIG. 4 illustrates that the logical block address LBA corresponds to one memory block BLK, but the scope of the present inventive concepts are not necessarily limited thereto. The logical block addresses may correspond to sequential sub-blocks or sequential programming units (for example, units in which programming is performed on memory cells) in one block, respectively, while maintaining logical sequentially. The correspondence relationship between the logical block address LBA and the memory block may be variously changed and implemented by those skilled in the art to which this disclosure pertains.

In some example embodiments, the memory block BLK may be a performance unit of an operation request. The non-volatile memory 133 may receive a write request or a read request from the storage controller 131. The write request may include a write command CMD, address ADDR, and data DATA. The read request may include a read command CMD and an address ADDR. The non-volatile memory 133 may perform an operation corresponding to the operation request. For example, when receiving the write request, the non-volatile memory 133 may write the received data DATA in the block BLK corresponding to the address ADDR. For example, when receiving the read request, the non-volatile memory 133 may read data stored in the memory block BLK corresponding to the address ADDR.

The host device 11 may receive information on the first to m-th zones Z1 to Zm of the storage device 13 from the storage device 13. The host device 11 may select at least one of the first to m-th zones Z1 to Zm. The host device 11 may request the storage device 13 to sequentially write for the selected zone. The host device 11 may request random read or sequential read for each of the first to m-th zones Z1 to Zm to the storage device 13.

The host device 11 may access the storage space of the storage device 13 based on the logical block address LBA. In some example embodiments, the host device 11 may include a write pointer for each of the plurality of zones Z1 to Zm in the storage device 13. The host device 11 may generate the logical block address LBA based on the write pointer and transmit the generated logical block address LBA together with the request signal (REQ) including the write command.

Referring back to FIG. 3, the control circuit 311 may receive the command CMD and the address ADDR from the storage controller 131 of FIG. 1, and may control the erase operation, write operation, and read operation of the non-volatile memory 30 based on the command CMD and the address ADDR.

For example, the control circuit 311 may generate control signals CON for controlling the voltage generator 309 and control signals PBC for controlling the page buffer circuit 305 based on the command CMD, and may generate a row address R_ADDR and a column address C_ADDR based on the address ADDR. The control circuit 311 may provide the row address R_ADDR to the address decoder 303 and the column address C_ADDR to the data input/output circuit 307.

The address decoder 303 may be connected to the memory cell array 301 through the plurality of string selection lines SSL, the plurality of word lines WL, and the plurality of ground selection lines GSL.

The voltage generator 309 may generate voltages VS required for the operation of the non-volatile memory 30 based on a power voltage PWR and the control signals CON. The voltages VS may be applied to the plurality of string selection lines SSL, the plurality of word lines WL, and the plurality of ground selection lines GSL through the address decoder 303. In addition, the voltage generator 309 may generate the erase voltage VERS required for an erase operation based on the power voltage PWR and the control signals CON. The erase voltage VERS may be applied, for example directly applied, to the memory cell array 301 or may be applied thereto through the bit line BL.

The page buffer circuit 305 may be connected to the memory cell array 301 through the plurality of bit lines BL. The page buffer circuit 305 may include a plurality of page buffers. In some example embodiments, one bit line may be connected to one page buffer. In other example embodiments, two or more bit lines may be connected to one page buffer.

The page buffer circuit 305 may store write data DATA to be written to the memory cell array 301 or read data DATA detected from the memory cell array 301. That is, the page buffer circuit 305 may operate as a write driver or a sense amplifier depending on an operation mode of the non-volatile memory 30.

The data input/output circuit 307 may be connected to the page buffer circuit 305 through the data lines DL. The data input/output circuit 307 may provide the write data DATA to the memory cell array 301 through the page buffer circuit 305 or may provide the read data outputted from the memory cell DATA array 301 through the page buffer circuit 305 to the outside, in response to the column address C_ADDR.

Figure 5:
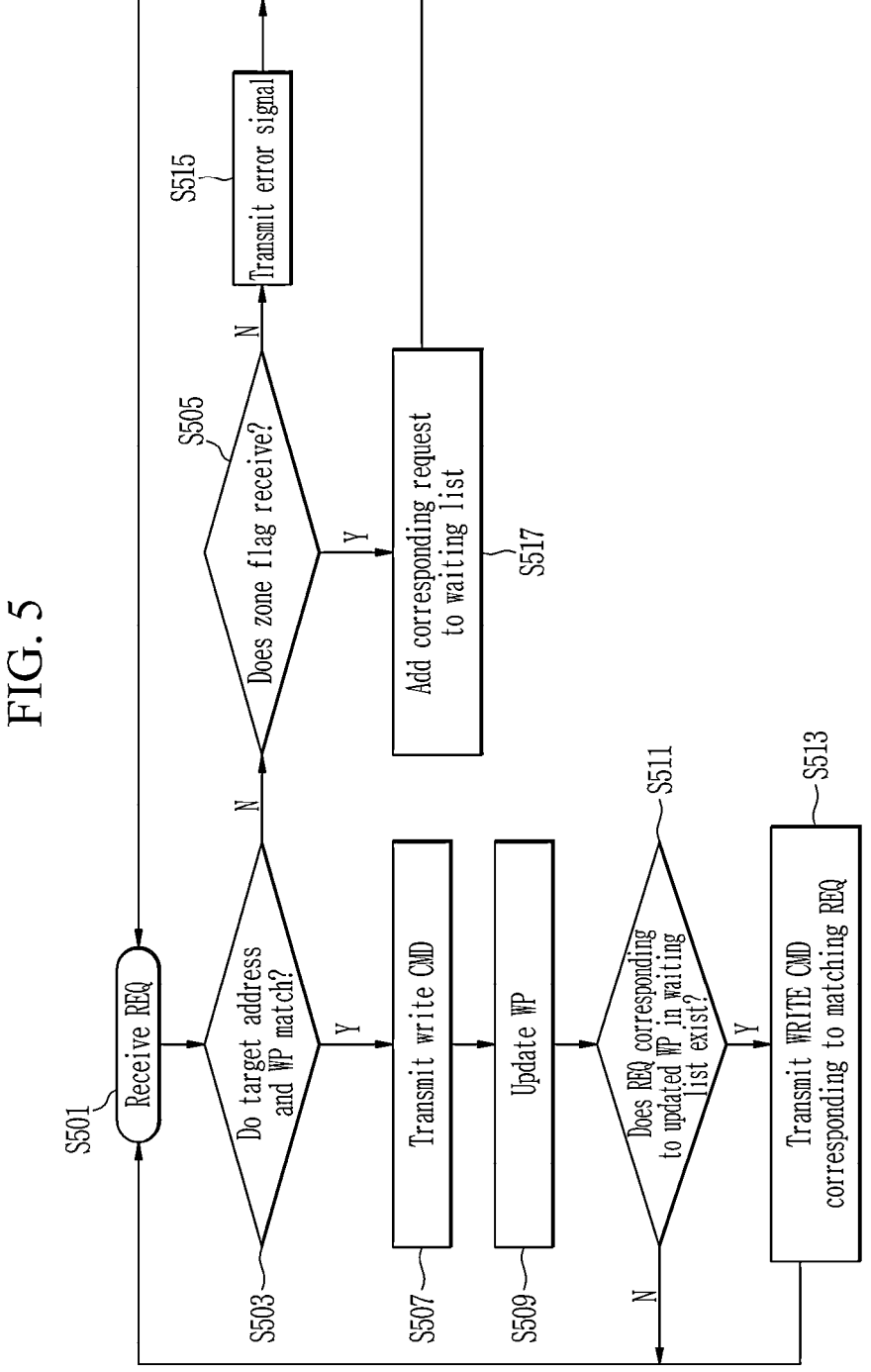
FIG. 5 illustrates a flowchart of a write operation of a storage system according to some example embodiments.

FIG. 5 illustrates a flowchart of a write operation of a storage system according to some example embodiments.

First, the storage controller 131 receives the request signal REQ including the write command from the host device 11 (S501).

In some example embodiments, the host device 11 may transmit the logical block address LBA and the data DQ together. The host device 11 may generate the logical block address LBA based on the write pointer within the host device 11. The write pointer may include information on the position at which data will be written within the storage device 13. Hereinafter, the logical block address LBA transmitted by the host device 11 is referred to as a target address.

The storage controller 131 determines whether the target address and the write pointer WP match (S503).

Specifically, the storage controller 131 may determine the zone that includes the block corresponding to the target address. The storage controller 131 may determine the position of the current write pointer WP in the corresponding zone. Thereafter, the storage controller 131 may determine whether the target address and the position of the write pointer WP are the same.

When the position of the logical block address LBA indicated by the target address and the write pointer WP are the same, the storage controller 131 transmits a write command (WRITE CMD) to the non-volatile memory 133 (S507).

Here, the write command (WRITE CMD) may be a command corresponding to the request signal REQ of the storage controller 131. For example, the storage controller 131 may determine an address ADDR corresponding to the target address and store data DATA corresponding to the received data DQ in the corresponding address ADDR.

Although not shown in FIG. 5, when the storage controller 131 completes the data DATA write operation to the non-volatile memory 133, the storage controller 131 may transmit a response indicating completion of the write operation corresponding to the request signal REQ to the host device 11.

Thereafter, the storage controller 131 updates the position of the current write pointer WP (S509).

For example, the storage controller 131 may update the current position of the write pointer WP to the lowest logical block address among the writeable logical block addresses included in the corresponding zone. That is, the updated write pointer WP may indicate the logical block address LBA immediately after the logical block address LBA corresponding to step S507.

The storage controller 131 determines whether a request signal REQ corresponding to the updated write pointer WP in the waiting list exists (S511).

For example, the storage controller 131 may determine whether the updated write pointer WP matches the lowest write pointer in the waiting list.

When the request signal REQ corresponding to the updated write pointer WP exists in the waiting list, the storage controller 131 transmits a write command (WRITE CMD) corresponding to the matching request signal REQ to the non-volatile memory 133 (S513).

Specifically, the storage controller 131 may transmit a data request signal for requesting data DQ corresponding to the matching request signal REQ to the host device 11. The host device 11 may transmit the corresponding data DQ to the storage device 13 in response to the signal requesting the data DQ. The storage controller 131 may generate the write command CMD based on the received data DQ. The storage controller 131 may transmit the write command CMD to the non-volatile memory 133.

Thereafter, the storage controller 131 may perform step S501.

When the positions of the logical block address LBA indicated by the target address and the write pointer WP are different, the storage controller 131 determines whether or not the zone flag ZF has been received (S505).

When the zone flag ZF of the disabled level is received or the zone flag ZF is not received, the storage controller 131 may determine that the corresponding request signal REQ is an error. Accordingly, the storage controller 131 may generate an error signal in response to the request signal REQ. The storage controller 131 may transmit the error signal to the host device 11 (S515). After transmitting the error signal to the host device 11, when the host device 11 transmits the request signal REQ including the write command to the storage controller 131, the storage controller 131 may perform step S501 again.

When receiving the zone flag ZF of the enable level, the storage controller 131 may add the request signal REQ to the waiting list (S517). In some example embodiments, the waiting list may include the request signal REQ received from the host device 11 and the logical block address LBA corresponding to the request signal REQ. Here, since the logical block address LBA may be generated based on the write pointer WP, the waiting list may include the request signal REQ and the write pointer WP corresponding to the request signal REQ. The storage controller 131 may store the waiting list in the buffer memory 207.

Thereafter, the storage controller 131 may perform step S501 again.

Meanwhile, FIG. 5 is described assuming that one request signal REQ includes one task request, but the present disclosure is not limited thereto, and one request signal REQ may include a plurality of task requests.

FIG. 6 to FIG. 9 illustrate an example of an operating method of a storage system.

Figure 6:
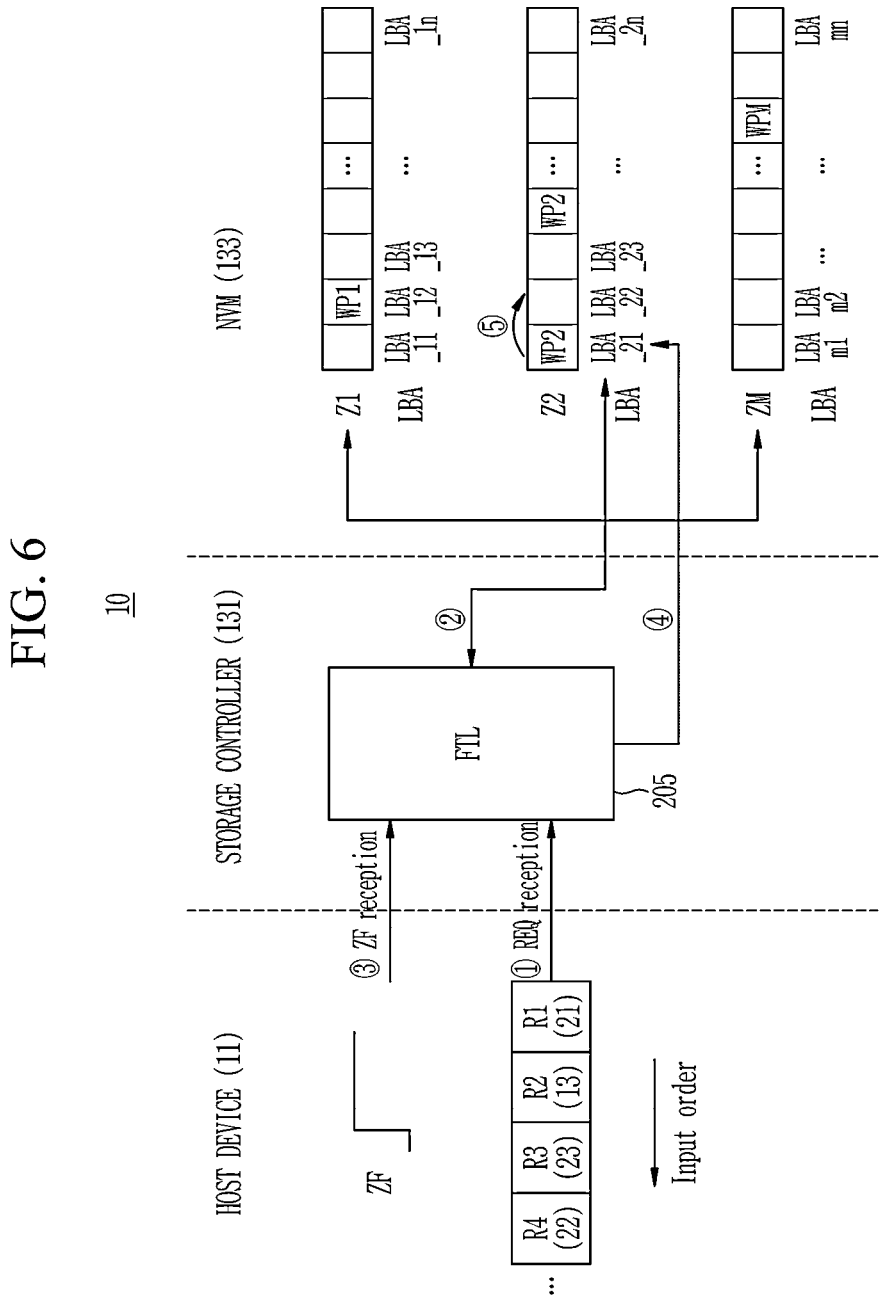
FIG. 6 to FIG. 9 illustrate an example of an operating method of a storage system.

Referring to FIG. 6, the storage controller 131 may receive a first task request R1 to a fourth task request R4 in input order. Specifically, the FTL 205 of the storage controller 131 may receive a plurality of task requests R1 to R4. Each of the plurality of task requests R1 to R4 may include a write command. Each of the plurality of task requests R1 to R4 may include the logical block address LBA in which the data DQ is to be stored.

First, the storage controller 131 may receive (①) the first task request R1 as the request signal REQ. For example, the logical block address LBA of the first task request R1 may be 21, and the first task request R1 may correspond to the second zone Z2.

First, the storage controller 131 may determine whether the logical block address LBA of the first task request R1 matches the write pointer WP2 of the second zone Z2 corresponding to the first task request R1. As shown in FIG. 6, the write pointer WP2 of the second zone Z2 may indicate the first block LBA_21. The storage controller 131 may determine (②) that the logical block address LBA of the first task request R1 matches the write pointer WP2.

The storage controller 131 may receive (③) the zone flag ZF together with the request signal REQ or after receiving the request signal REQ. In FIG. 6 to FIG. 9, the zone flag signal ZF may be an enable signal.

Thereafter, the storage controller 131 may perform an operation corresponding to the first task request R1. That is, the storage controller 131 may store (④) data corresponding to the first task request R1 in the first block LBA_21 of the non-volatile memory 133.

Although not shown in FIG. 6, the storage controller 131 may transmit a signal requesting the data DQ corresponding to the first task request R1 to the host device 11. The host device 11 may transmit the data DQ corresponding to the first task request R1 to the storage device 13 in response to the signal requesting the data DQ. The storage controller 131 may store data corresponding to the first task request R1 based on the received data DQ.

The storage controller 131 may store data and update (⑤) the write pointer WP2 of the second zone Z2. That is, the write pointer WP2 may point to the second block LBA_22.

Meanwhile, since there are no task requests yet stored in the waiting list, the storage controller 131 can process the next task request.

Figure 7:
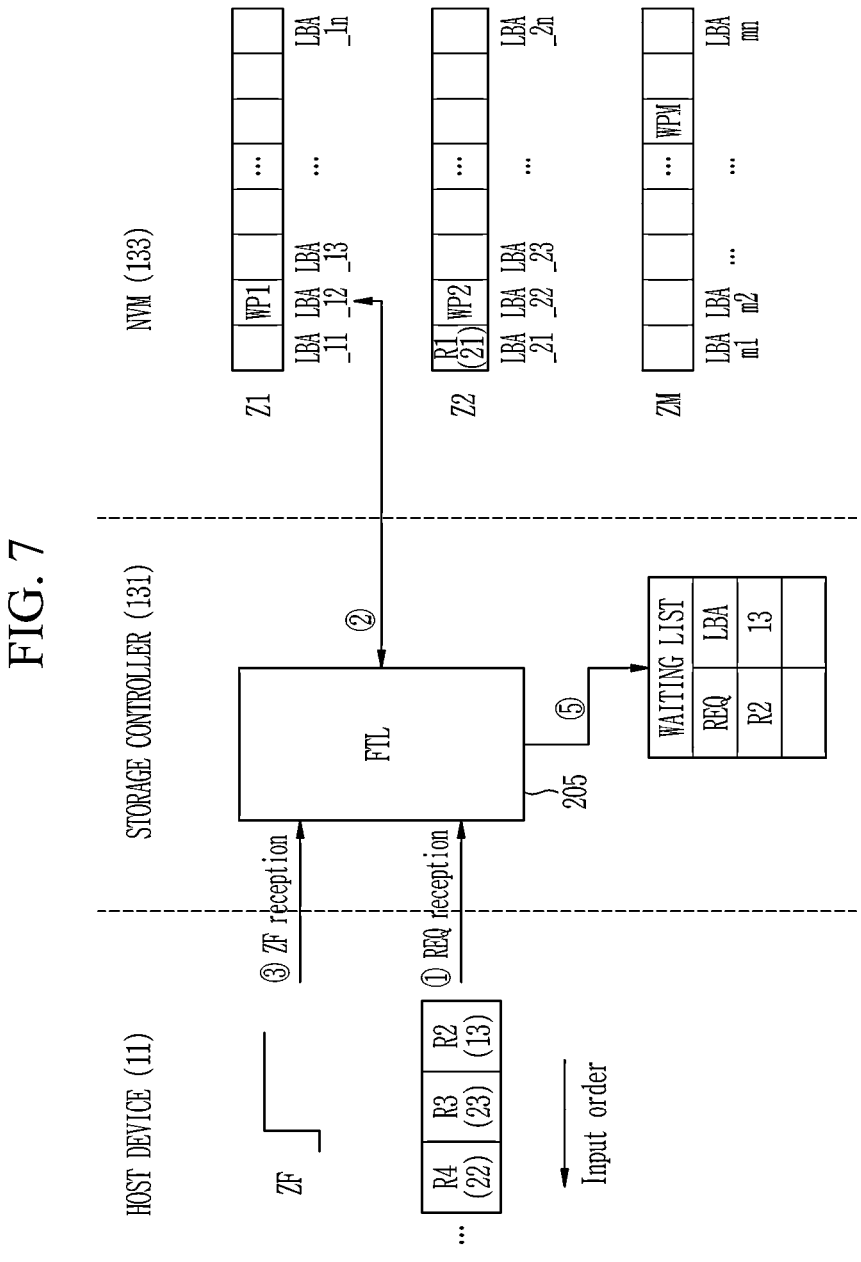

Referring to FIG. 7, the storage controller 131 may receive the second task request R2 as the request signal REQ. The logical block address LBA of the second task request R2 may be 13, and the second task request R2 may correspond to the first zone Z1.

The storage controller 131 may determine whether the logical block address LBA of the second task request R2 matches the write pointer WP1 of the first zone Z1 to which the second task request R2 corresponds. As shown in FIG. 7, the write pointer WP1 of the first zone Z1 may point to the second block LBA_12. The storage controller 131 may determine (②) that the logical block address LBA of the second task request R2 and the write pointer WP2 do not match.

The storage controller 131 may add (⑤) the second task request R2 to the waiting list. The waiting list may include the second work request R2 and the corresponding logical block address LBA.

Figure 8:
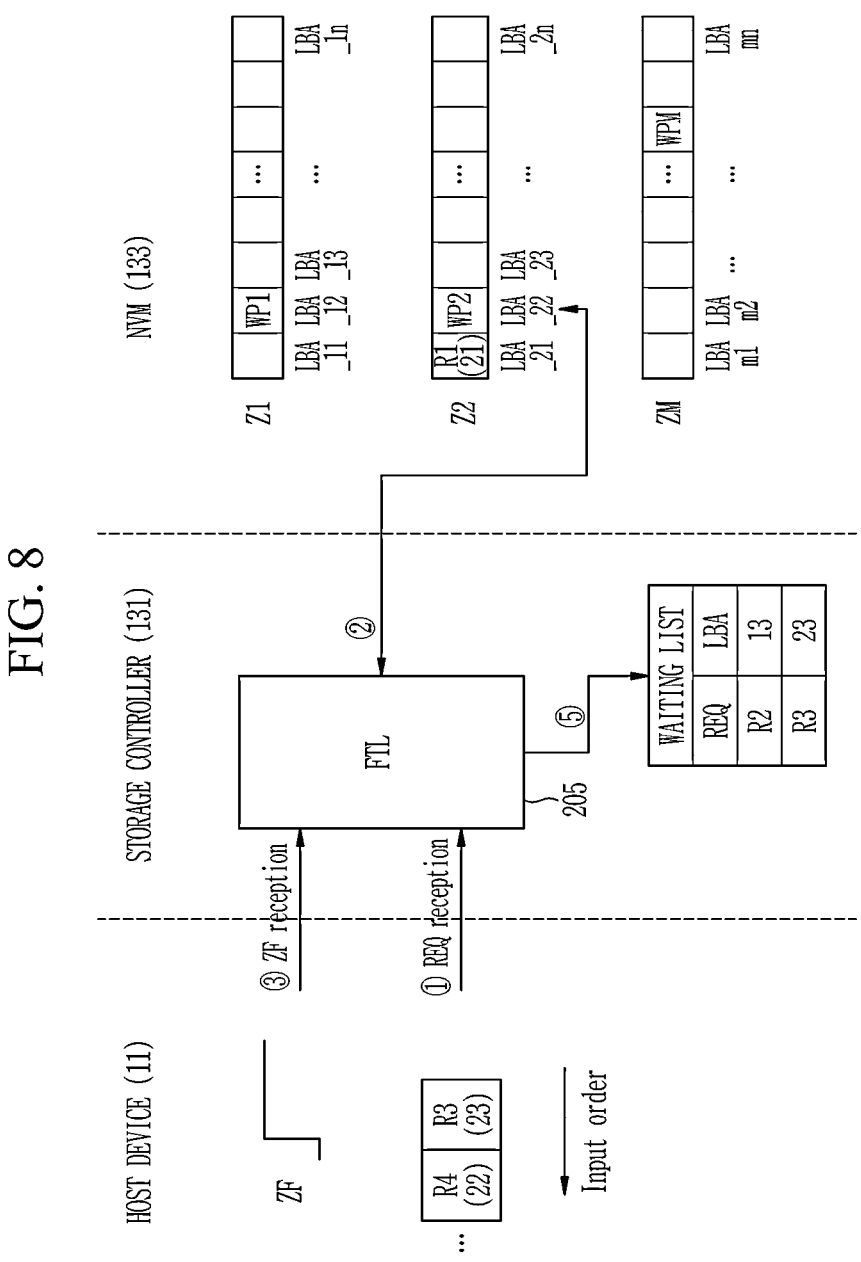

Referring to FIG. 8, the storage controller 131 may receive the third task request R3 as the request signal REQ. The logical block address LBA of the third task request R3 may be 23, and the third task request R3 may correspond to the second zone Z2.

The storage controller 131 may determine whether the logical block address LBA of the third task request R3 matches the write pointer WP2 of the second zone Z2 to which the third task request R3 corresponds. As shown in FIG. 8, the write pointer WP2 of the second zone Z2 may point to the second block LBA_22. The storage controller 131 may determine (②) that the logical block address LBA of the third task request R3 and the write pointer WP2 do not match.

The storage controller 131 may add (⑤) the third task request R3 to the waiting list. The waiting list may include the second task request R2 and the corresponding logical block address LBA, the third task request R3 and the corresponding logical block address LBA.

Figure 9:
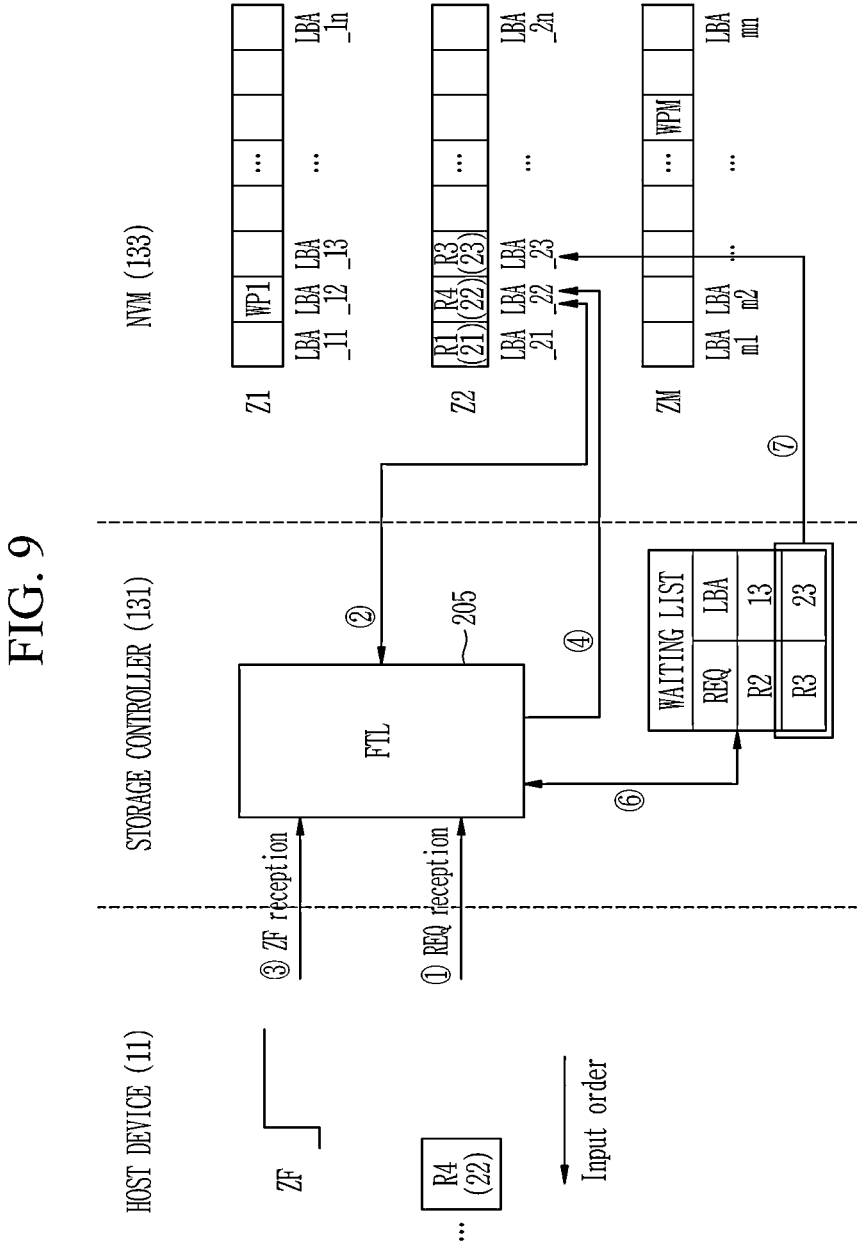

Referring to FIG. 9, the storage controller 131 may receive the fourth task request R4 as the request signal REQ. The logical block address LBA of the fourth task request R4 may be 22, and the fourth task request R4 may correspond to the second zone Z2.

The storage controller 131 may determine whether the logical block address LBA of the fourth task request R4 matches the write pointer WP2 of the second zone Z2 to which the fourth task request R4 corresponds. As shown in FIG. 9, the write pointer WP2 of the second zone Z2 may point to the second block LBA_22. The storage controller 131 may determine (②) that the logical block address LBA of the fourth task request R4 matches the write pointer WP2.

Thereafter, the storage controller 131 may perform an operation corresponding to the fourth task request R4. That is, the storage controller 131 may store (④) data corresponding to the fourth task request R4 in the second block LBA_22 of the non-volatile memory 133.

Although not shown in FIG. 9, the storage controller 131 may transmit a signal requesting the data DQ corresponding to the fourth task request R4 to the host device 11. The host device 11 may transmit the data DQ corresponding to the fourth task request R4 to the storage device 13 in response to the signal requesting the data DQ. The storage controller 131 may store data corresponding to the fourth task request R4 based on the received data DQ.

The storage controller 131 may store data and update (⑤) the write pointer WP2 of the second zone Z2. That is, the write pointer WP2 may point to the third block LBA_23.

Meanwhile, the storage controller 131 may determine (⑥) whether a task request corresponding to the updated write pointer WP2 exists in the waiting list. As described above, the waiting list may include the second task request R2 and the corresponding logical block address LBA, the third task request R3 and the corresponding logical block address LBA. Accordingly, the storage controller 131 may determine that the task request corresponding to the updated write pointer WP2 exists in the waiting list, and store (⑦) data corresponding to the third task request R3 in the third block LBA_23.

In some example embodiments, the storage controller 131 may transmit a data request signal requesting the data DQ corresponding to the third task request R3 to the host device 11. The host device 11 may transmit the data DQ corresponding to the third task request R3 to the storage device 13 in response to the signal requesting the data DQ. The storage controller 131 may store data corresponding to the third task request R3 based on the received data DQ.

Thereafter, the storage controller 131 may delete the third task request R3 from the waiting list.

The storage controller 131 may sequentially write the request signal REQ received from the host device 11 to the non-volatile memory 133 without allocating additional resources within the storage device 13. As a result, the non-volatile memory 133 may be managed more efficiently.

Figure 10:
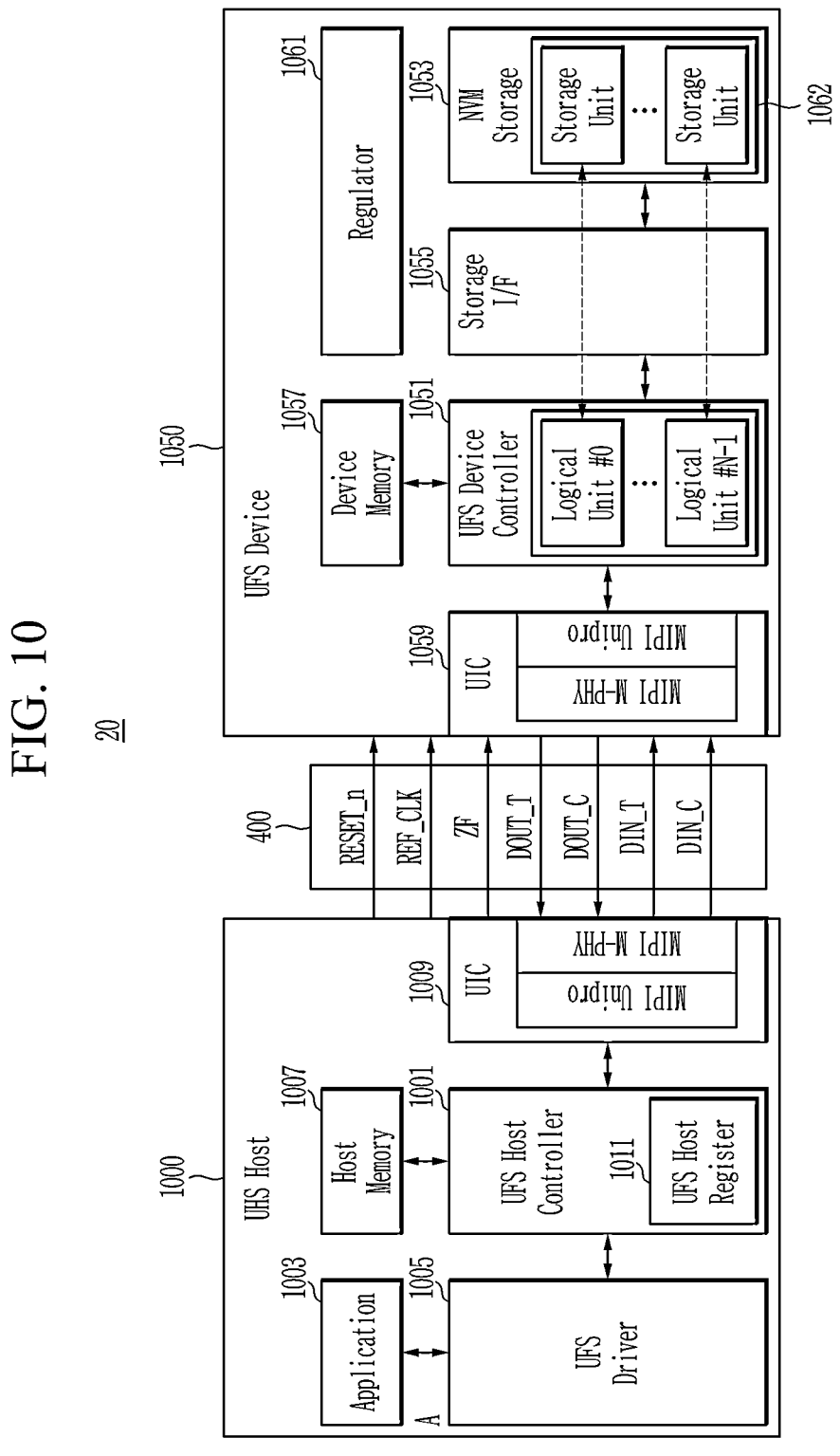
FIG. 10 illustrates a storage system according to some example embodiments.

FIG. 10 illustrates a storage system according to an example embodiment.

Specifically, FIG. 10 is a drawing illustrating a case in which the storage system 10 (see FIG. 1) is a system that follows the Universal Flash Storage (UFS) standard announced by the Joint Electronic Device Engineering Council (JEDEC).

Referring to FIG. 10, a UFS system 20 may include a UFS host device 1000, a UFS device 1050, and a UFS interface 400.

The UFS host device 1000 and the UFS device 1050 may be interconnected through the UFS interface 400. In some example embodiments, the UFS host device 1000 may be implemented as a portion of an application processor.

The UFS host device 1000 may include a UFS host controller 1001, an application 1003, a UFS driver 1005, a host memory 1007, and a UFS interconnect (UIC) layer 1009.

The UFS device 1050 may include a UFS device controller 1051, a non-volatile storage 1053, a storage interface 1055, a device memory 1057, a UIC layer 1059, and a regulator 1061.

The non-volatile storage 1053 may be configured of a plurality of storage units 1062. The storage unit 1062 may include a V-NAND flash memory of a 2D structure or a 3D structure, but the present disclosure is not limited thereto, and the storage unit 1062 may include other types of non-volatile memory such as a PRAM and/or a RRAM.

The UFS device controller 1051 and the non-volatile storage 1053 may be connected to each other through the storage interface 1055. The storage interface 1055 may be implemented to comply with standard protocols such as Toggle or ONFI.

The application 1003 may be a program that communicates with the UFS device 1050 to use functions of the UFS device 1050. The application 1003 may transmit an input/output request (IOR) to the UFS driver 1005 for input/output to the UFS device 1050. The input/output request IOR may mean a data read request, a write request, and/or an erase request, but the present disclosure is not limited thereto.

The UFS driver 1005 may manage the UFS host controller 1001 through a UFS-host controller interface (UFS-HCI). The UFS driver 1005 may convert the input/output request generated by the application 1003 into a UFS command defined by the UFS standard, and transmit the converted UFS command to the UFS host controller 1001. One input/output request may be converted into a plurality of UFS commands. The UFS command may be basically a command defined by the SCSI (Small Computer System Interface) standard, but may also be a command dedicated to the UFS standard.

The UFS host controller 1001 may transmit the UFS command converted by the UFS driver 1005 to the UIC layer 1059 of the UFS device 1050 through the UIC layer 1009 and the UFS interface 400. In this case, a UFS host register 1011 of the UFS host controller 1001 may serve as a command queue (CQ). The UIC layer 1009 on the UFS host device 1000 side may include MIPI M-PHY and MIPI UniPro, and the UIC layer 1059 on the UFS device 1050 side may also include MIPI M-PHY and MIPI UniPro.

The UFS interface 400 may include a line transmitting a reference clock REF_CLK, a line transmitting a hardware reset signal RESET_n for the UFS device 1050, a pair of lines transmitting a pair of differential input signals DIN_T and DIN_C, a pair of lines transmitting a pair of differential output signals DOUT_T and DOUT_C, and a line transmitting a zone flag ZF.

The UFS device 1050 may generate clocks of various frequencies from the reference clock provided from the UFS host device 1000 using a phase-locked loop (PLL) or the like. In addition, the UFS host device 1000 may set a value of a data rate between the UFS host device 1000 and the UFS device 1050 through the frequency value of the reference clock. That is, the value of the data rate may be determined depending on the frequency value of the reference clock.

In some example embodiments, the UFS device controller 1051 may force sequential write to the non-volatile storage 1053 when receiving the zone flag ZF from the UFS host device 1000. For example, the UFS device controller 1051 may manage data corresponding to a write request received from the UFS host device 1000 to be logically and physically sequentially stored in the non-volatile storage 1053.

Specifically, when the zone flag ZF is received along with the write request signal, the UFS device controller 1051 may determine whether to perform an address mapping operation for the corresponding request signal based on the logical block address corresponding to the request signal.

Meanwhile, the UFS device controller 1051 may generate the waiting list. The waiting list may include information on a request signal (that is, an unprocessed request signal) in which an address mapping operation has not been performed among the received request signals.

The UFS interface 400 may support a plurality of lanes, and each lane may be implemented as a differential pair. For example, the UFS interface 400 may include one or more receiving lanes and one or more transmitting lanes. In FIG. 10, a pair of lines transmitting the differential input signal pair DIN_T and DIN_C may configure the receiving lane, and a pair of lines transmitting the differential output signal pair DOUT_T and DOUT_C may configure transmitting lane. FIG. 10 illustrates one transmitting lane and one receiving lane, but the number of transmitting lanes and receiving lanes may be changed.

The receiving lane and the transmitting lane may transmit data in a serial communication method, and full-duplex communication between the UFS host device 1000 and the UFS device 1050 is possible by a structure in which the receiving lane and the transmitting lane are separated. That is, the UFS device 1050 may transmit data to the UFS host device 1000 through the transmitting lane even while receiving data from the UFS host device 1000 through the receiving lane. In addition, control data such as commands from the UFS host device 1000 to the UFS device 1050 and user data that the UFS host device 1000 intends to store in the non-volatile storage 1053 of the UFS device 1050 or to read from the non-volatile storage 1053 may be transmitted through the same lane. Accordingly, there is no need to provide a separate lane for data transmission other than the pair of receiving lanes and the pair of transmitting lanes between the UFS host device 1000 and the UFS device 1050.

Figure 11:
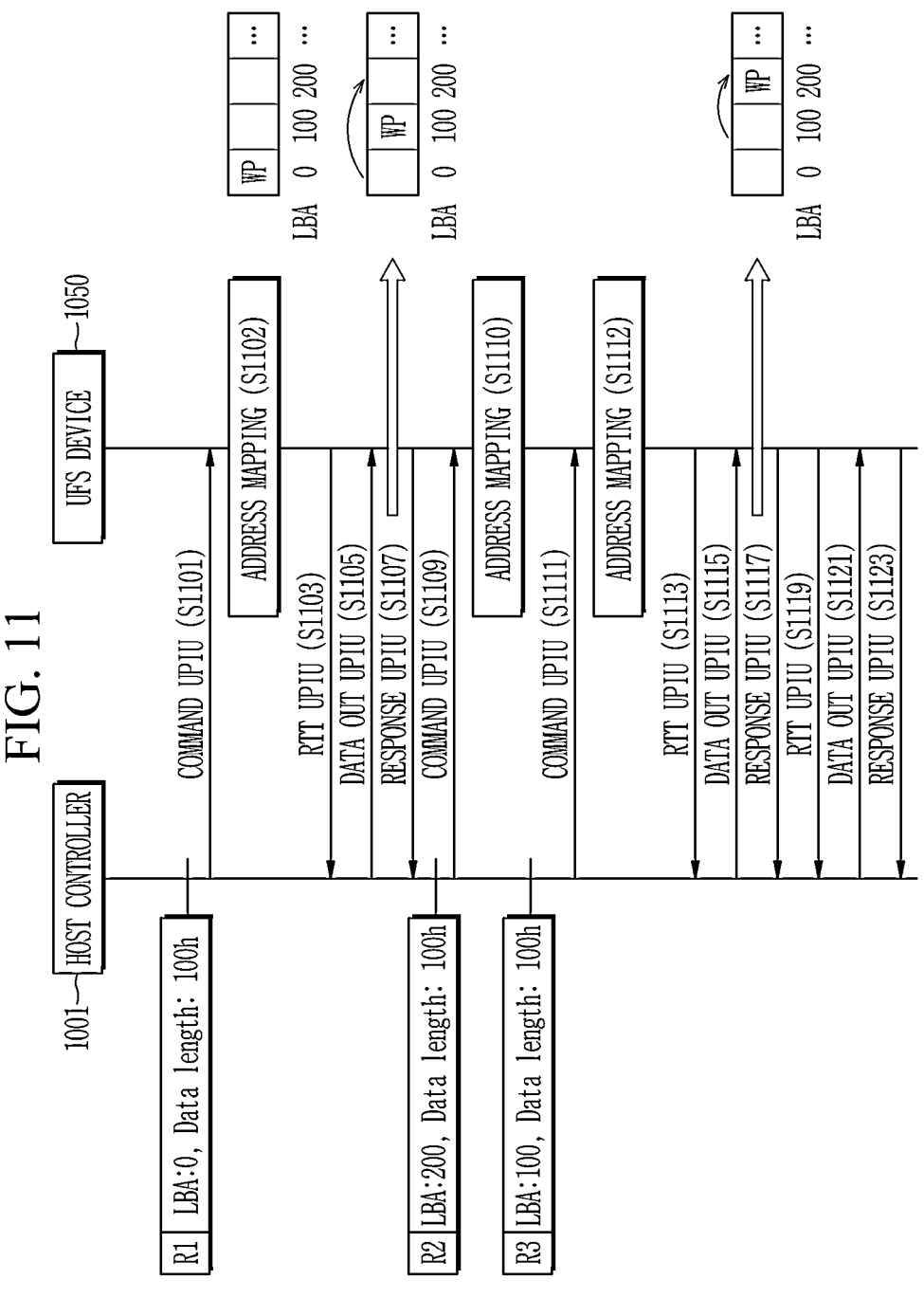
FIG. 11 illustrates a flowchart of a write operation of the storage system according to FIG. 10.

FIG. 11 illustrates a flowchart of a write operation of the storage system according to FIG. 10.

First, the UFS device 1050 receives a command UFS protocol information unit (UPIU) from the host controller 1001 (S1101).

Specifically, the command UPIU may be a command message to request writing of data to the UFS device 1050. The command UPIU may include a position for writing write data (for example, the logical block address LBA), write data, and a length of write data (for example, 100h).

Referring to FIG. 11, the command UPIU may be a command message to request data writing of 100h length to an LBA of 0.

The UFS device 1050 may perform address mapping (S1102).

The address mapping (S1102) may include an operation of comparing the value of the write pointer WP in the UFS device 1050 with the logical block address LBA received from the host controller 1001. When the value of the write pointer WP in the UFS device 1050 is the same as the logical block address LBA received from the host controller 1001, the UFS device 1050 may determine that it is ready to receive the write data.

Since the write pointer WP of the UFS device 1050 points to LBA 0, the UFS device 1050 may determine that the value of the write pointer WP and the logical block address LBA are the same.

When the UFS device 1050 is ready to receive the write data, it transmits a ready to transfer (RTT) UPIU to the host controller 1001 (S1103).

In some example embodiments, the RTT UPIU may include information about a data range that the UFS device 1050 may receive.

The host controller 1001 transmits DATA OUT UPIU to the UFS device 1050 in response to the RTT UPIU (S1105).

In some example embodiments, the DATA OUT UPIU may include write data.

The UFS device 1050 transmits RESPONSE UPIU to the host controller 1001 (S1107).

In some example embodiments, the RESPONSE UPIU may be a message indicating that the UFS device 1050 has completed writing the write data. In this case, the write pointer WP of the UFS device 1050 may be updated to point to the LBA 100.

The UFS device 1050 receives a command UPIU from the host controller 1001 (S1109).

Specifically, the command UPIU may be a command message to request writing of data to the UFS device 1050. The command UPIU may be a command message to request data writing of 100h length to an LBA of 200.

The UFS device 1050 may perform address mapping (S1110).

The address mapping (S1110) may include an operation of comparing the value of the write pointer WP in the UFS device 1050 with the logical block address LBA received from the host controller 1001. When the value of the write pointer WP in the UFS device 1050 is not the same as the logical block address LBA received from the host controller 1001, the UFS device 1050 may add information on the received command UPIU to the waiting list.

Since the write pointer WP of the UFS device 1050 points to LBA 100 and the logical block address LBA in the command UPIU indicates 200, the UFS device 1050 may determine that the value of the write pointer WP and the logical block address LBA are different.

The UFS device 1050 receives a command UPIU from the host controller 1001 (S11111).

Specifically, the command UPIU may be a command message to request writing of data to the UFS device 1050. The command UPIU may be a command message to request data writing of 100h length to an LBA of 100.

The UFS device 1050 may perform address mapping (S1112).

Since the write pointer WP of the UFS device 1050 points to LBA 100 and the logical block address LBA indicates 100, the value of the write pointer WP in the UFS device 1050 and the logical block address LBA received from the host controller 1001 may be determined to be the same. Accordingly, the UFS device 1050 may determine that it is ready to receive the write data.

The UFS device 1050 transmits a ready to transfer (RTT) UPIU to the host controller 1001 (S1113).

In some example embodiments, the RTT UPIU may include information about a data range that the UFS device 1050 may receive.

The host controller 1001 transmits DATA OUT UPIU to the UFS device 1050 in response to the RTT UPIU (S1115).

In some example embodiments, the DATA OUT UPIU may include write data.

The UFS device 1050 transmits RESPONSE UPIU to the host controller 1001 (S1117).

In some example embodiments, the RESPONSE UPIU may be a message indicating that the UFS device 1050 has completed writing the write data. In this case, the write pointer WP of the UFS device 1050 may be updated to point to the LBA 200.

Meanwhile, the UFS device 1050 may determine whether the command UPIU corresponding to the updated write pointer WP exists in the waiting list. The logical block address LBA in the command UPIU received in step S1109 indicates the LBA 200, and the current write pointer WP indicates the LBA 200, so the UFS device 1050 may determine that the value of the write pointer WP and the logical block address LBA are the same.

Accordingly, the UFS device 1050 may determine that it is ready to receive the write data.

The UFS device 1050 transmits a ready to transfer (RTT) UPIU to the host controller 1001 (S1119).

In some example embodiments, the RTT UPIU may include information about a data range that the UFS device 1050 may receive.

The host controller 1001 transmits DATA OUT UPIU to the UFS device 1050 in response to the RTT UPIU (S1121).

In some example embodiments, the DATA OUT UPIU may include write data.

The UFS device 1050 transmits RESPONSE UPIU to the host controller 1001 (S1123).

In this case, the write pointer WP of the UFS device 1050 may be updated to point to the LBA 300.

Figure 12:
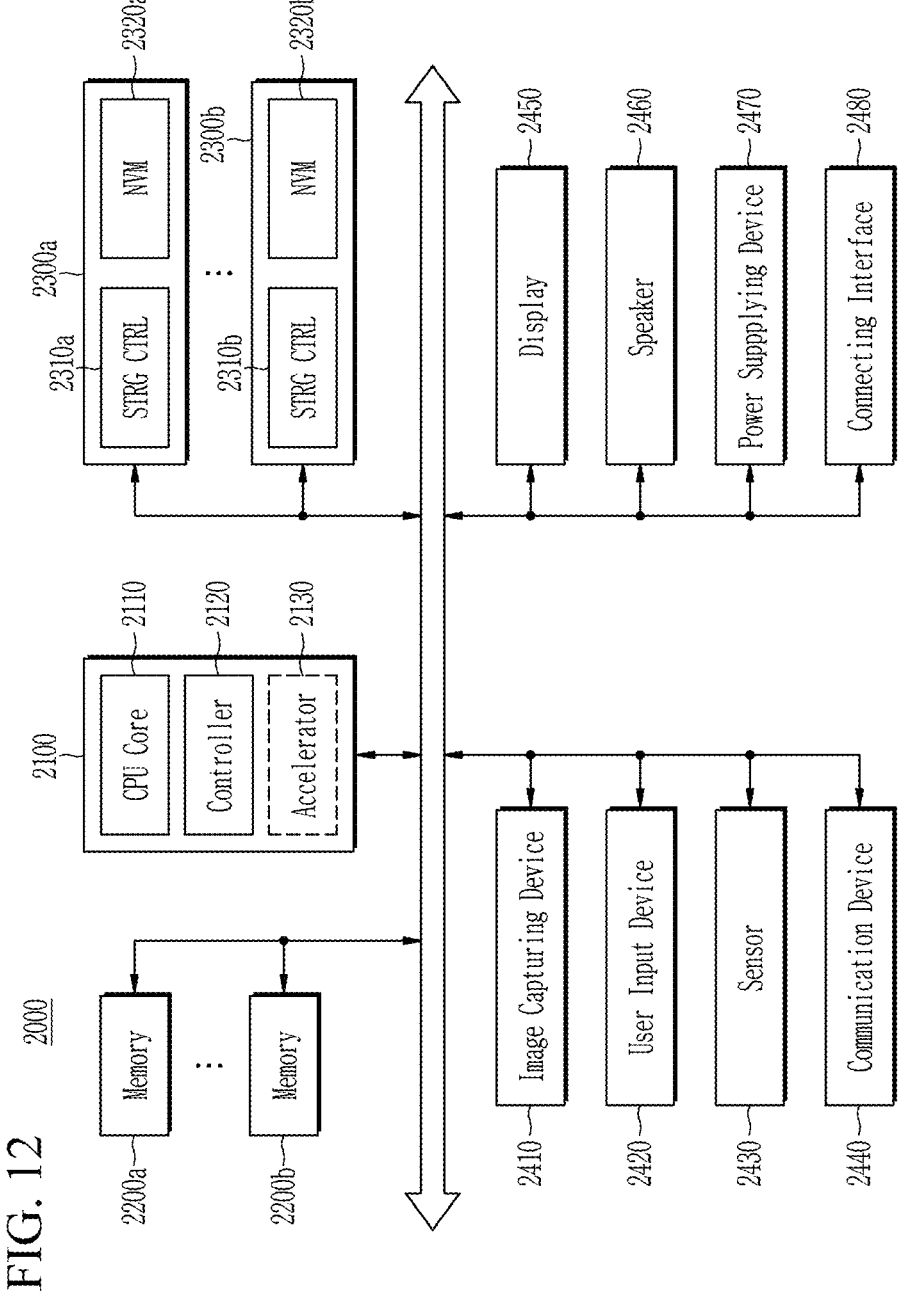
FIG. 12 illustrates a system according to some example embodiments.

FIG. 12 illustrates a system according to an example embodiment.

A system 2000 according to an example embodiment may be a mobile system such as a mobile phone, a smart phone, a tablet personal computer, a wearable device, a healthcare device, or an Internet of things (IoT) device. However, the system 2000 of FIG. 12 is not necessarily limited to the mobile system, and may be a personal computer, a laptop computer, a server, a media player, or an automatic device such as navigation.

Referring to FIG. 12, the system 2000 may include a main processor 2100, memories 2200*a* and 2200*b*, and storage devices 2300*a* and 2300*b*, and may further include one or more of an image capturing device 2410, a user input device 2420, a sensor 2430, a communication device 2440, a display 2450, a speaker 2460, a power supplying device 2470, and a connecting interface 2480.

The main processor 2100 may control the overall operation of the system 2000, more specifically, the operation of other components configuring the system 2000. The main processor 2100 may be implemented as a general-purpose processor, a dedicated processor, or an application processor.

The main processor 2100 may include one or more CPU cores 2110, and may further include a controller 2120 to control the memories 2200*a* and 2200*b* and/or the storage devices 2300*a* and 2300*b*. In some example embodiments, the main processor 2100 may further include an accelerator 2130, which is a dedicated circuit for high-speed data computation, such as artificial intelligence (AI) data computation. The accelerator 2130 may include a graphics processing unit (GPU), a natural processing unit (NPU), and/or a data processing unit (DPU), and may be implemented as a separate chip physically independent of other components of the main processor 2100.

The memories 2200*a* and 2200*b* may be used as the main memory device of the system 2000, and may include a volatile memory such as an SRAM and/or a DRAM, but may also include a non-volatile memory such as a flash memory, a PRAM, and/or an RRAM. The memories 2200*a* and 2200*b* may be implemented in the same package as the main processor 2100.

The storage devices 2300*a* and 2300*b* may function as non-volatile storage devices that store data regardless of whether power is supplied or not, and may have a relatively large storage capacity compared to the memories 2200*a* and 2200*b*. The storage devices 2300*a* and 2300*b* may include non-volatile memories (NVM) 2320*a* and 2320*b* that store data under control of storage controllers 2310*a* and 2310*b* (STRG CTRL) and storage controllers 2310*a* and 2310*b*. The non-volatile memories 2320*a* and 2320*b* may include a flash memory with a 2-dimensional (2D) structure or a 3-dimensional (3D) vertical NAND (V-NAND) structure, and may also include other types of non-volatile memory such as a PRAM and/or an RRAM.

The storage devices 2300*a* and 2300*b* may be included in the system 2000 in a state of being physically separated from the main processor 2100, or may be implemented in the same package as the main processor 2100. In addition, the storage devices 2300*a* and 2300*b* have a structure such as a solid state device (SSD) or a memory card, so that the storage devices 2300*a* and 2300*b* may be detachably combined with other components of the system 2000 through an interface such as the connecting interface 2480, which will be described later. The storage devices 2300*a* and 2300*b* may be devices to which standard protocols such as Universal Flash Storage (UFS), embedded multi-media card (eMMC), or non-volatile memory express (NVMe) are applied, but are not limited thereto.

The image capturing device 2410 may capture still images or moving images, and may be a camera, a camcorder, and/or a webcam.

The user input device 2420 may receive various types of data inputted from a user of the system 2000, and may be a touch pad, a keypad, a keyboard, a mouse, and/or a microphone.

The sensor 2430 may detect various types of physical quantities that may be obtained from the outside of the system 2000, and convert the detected physical quantities into electrical signals. The sensor 2430 may be a temperature sensor, a pressure sensor, an illuminance sensor, a position sensor, an acceleration sensor, a biosensor, and/or a gyroscope sensor.

The communication device 2440 may transmit and receive signals to and from other devices outside the system 2000 according to various communication protocols. The communication device 2440 may be implemented by including an antenna, a transceiver, and/or a modem.

The display 2450 and the speaker 2460 may function as output devices that output visual information and auditory information to users of the system 2000, respectively.

The power supplying device 2470 may appropriately convert power supplied from a battery (not shown) embedded in the system 2000 and/or an external power source and supply it to respective components of the system 2000.

The connecting interface 2480 may provide a connection between the system 2000 and an external device connected to the system 2000 to exchange data with the system 2000. The connecting interface 2480 may be implemented by various interface methods such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), an NVMe, an IEEE 1394, a universal serial bus (USB), a secure digital (SD) card, a multi-media card (MMC), an eMMC, a UFS, an embedded universal flash storage (eUFS), and/or a compact flash (CF) card.

The storage devices 2300*a* and 2300*b* may correspond to the storage device 13 described with reference to FIG. 1 and the UFS device 1050 described with reference to FIG. 10. The main processor 2100 may correspond to the host device 11 described with reference to FIG. 1 or the UFS host 1000 described with reference to FIG. 10.

The storage devices 2300*a* and 2300*b* may sequentially write request signals received from the main processor 2100 in the storage devices 2300*a* and 2300*b* to the non-volatile memories 2320*a* and 2320*b*. The storage devices 2300*a* and 2300*b* may enable sequential writing of the non-volatile memories 2320*a* and 2320*b* without allocating additional resources for storing data corresponding to the request signal.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While the example embodiments of the present inventive concepts have been described in connection with what is presently considered to be example embodiments, it is to be understood that the disclosure is not limited to the disclosed example embodiments, but, on the contrary, is intended to cover various modifications and equivalent arrangements included within the spirit and scope of the appended claims.

What is claimed is:

1. A storage device comprising:

a non-volatile memory including a plurality of zones configured to sequentially store data using a write pointer indicating a position to write data; and a storage controller configured to receive a plurality of task requests respectively including a logical block address and a write command, perform a write operation corresponding to the write command of a first task request among the plurality of task requests to the non-volatile memory in response to a position of the write pointer matching a first logical block address corresponding to the first task request, update the position of the write pointer after the write operation corresponding to the first task request, store in a waiting list, a logical block address and a write command of a second task request among the plurality of task requests in response to the position of the write pointer failing to match a second logical block address corresponding to the second task request, and compare the position of the updated write pointer with the second logical block address corresponding to the second task request in the waiting list, wherein the storage controller is further configured to:

receive a zone flag indicating that the storage device is a zoned device, store the second task request in the waiting list in response to the position of the write pointer not matching the second logical block address and the zone flag being received, and generate an error signal indicating that the plurality of task requests are errors in response to the position of the write pointer not matching a logical block address and the zone flag not being received.

2. The storage device of claim 1, wherein each of the plurality of zones includes a plurality of blocks whose addresses are adjacent to each other, and each of the plurality of zones includes a corresponding write pointer.

3. The storage device of claim 2, wherein the storage controller is configured to determine a first zone in the plurality of zones, the first zone including the first logical block address, and determine whether a first write pointer of the first zone and the first logical block address match.

4. The storage device of claim 3, wherein the storage controller is configured to perform a write operation corresponding to a write command of the second task request to the non-volatile memory in response to the first write pointer and the second logical block address matching.

5. An operating method of a storage device, comprising:

receiving a plurality of task requests, each task request respectively including a logical block address and a write command in a non-volatile memory, the non-volatile memory including a plurality of zones including a plurality of blocks whose addresses are adjacent to each other;

comparing a first logical block address corresponding to a first task request among the plurality of task requests and a position of a write pointer indicating a position to write data to the non-volatile memory;

performing a write operation corresponding to a write command of the first task request on an address corresponding to the first logical block address corresponding to the first task request of the non-volatile memory in response to the first logical block address and the position of the write pointer matching;

updating the position of the write pointer after performing the write operation corresponding to the first task request;

storing in a waiting list, a logical block address and a write command of a second task request among the plurality of task requests in response to the position of the write pointer failing to match a second logical block address corresponding to the second task request; and comparing the position of the updated write pointer with the second logical block address corresponding to the second task request in the waiting list, wherein the method further comprises:

receiving a zone flag indicating that the storage device is a zoned device, and generating an error signal indicating that the plurality of task requests are errors in response to the zone flag not being received.

6. The operating method of the storage device of claim 5, wherein each of the plurality of zones includes a corresponding write pointer, and wherein comparing the first logical block address corresponding to the first task request among the plurality of task requests and a position of the write pointer indicating a position to write data to the non-volatile memory includes, determining a first zone including the first logical block address in the plurality of zones, and determining whether a first write pointer of the first zone and the first logical block address match.

7. The operating method of the storage device of claim 6, further comprising:

transmitting a data request signal corresponding to the second task request in response to the first write pointer and the second logical block address matching, and receiving second data corresponding to the second task request in response to the data request signal and performing a write operation corresponding to a write command of the second task request to the non-volatile memory.

8. A storage system comprising:

a host device configured to transmit a plurality of task requests respectively including a logical block address and a write command; and a storage device configured to perform a write operation corresponding to a write command of a first task request among the plurality of task requests in a non-volatile memory including a plurality of zones in response to a first logical block address corresponding to the first task request and a position of a write pointer indicating a position to write data matching, update the position of the write pointer after the write operation corresponding to the first task request, store in a waiting list, a logical block address and a write command of a second task request among the plurality of task requests in response to the position of the write pointer failing to match a second logical block address corresponding to the second task request, and compare the position of the updated write pointer with the second logical block address corresponding to the second task request in the waiting list, wherein the host device is configured to transmit a zone flag indicating that the storage device is a zoned device, and wherein the storage device is configured to generate an error signal indicating that the plurality of task requests are errors in response to the zone flag not being received.

9. The storage system of claim 8, wherein the storage device is configured to determine a first zone including the first logical block address in the plurality of zones and determine whether a first write pointer of the first zone and the first logical block address match.

10. The storage system of claim 9, wherein the storage device is configured to transmit a data request signal corresponding to the second task request in response to the first write pointer and the second logical block address matching.

11. The storage system of claim 10, wherein the host device is configured to transmit second data corresponding to the second task request in response to the data request signal to the storage device, and the storage device is configured to perform a write operation of writing the second data to the non-volatile memory.

\* \* \* \* \*